United States Patent Office 3,338,810
Patented Aug. 29, 1967

3,338,810
ULTRAVIOLET LIGHT REACTION BETWEEN AN ALKYL POLYTHIOL AND A LIQUID DIENE POLYMER
Paul F. Warner, Phillips, Tex., assignor to Phillips Petroleum Company, a corporation of Delaware
No Drawing. Filed Oct. 5, 1964, Ser. No. 401,660
9 Claims. (Cl. 204—159.18)

ABSTRACT OF THE DISCLOSURE

Alkyl polythiols reacted with polyunsaturated hydrocarbon diene polymer at ambient temperature and in presence of ultraviolet light. Product is a clear plastic useful as window material and the like.

---

This invention relates to polysulfide polymers and a method of making same.

Heretofore polythiols have been reacted with polyunsaturated polymers at temperatures of at least 120° F. to yield a product which is opaque, e.g. of a color which prevented one from seeing through the product. Also heretofore thiols have been reacted with a diene monomer by exposing the materials to a temperature of at least 105° F. with or without the presence of a mercury arc light for a period of at least twelve days to produce a relatively fluid polymer.

Quite unexpectedly, it has been found that a clear, solid, highly cross-linked polysulfide polymer can be produced by reacting an alkyl polythiol and a polyunsaturated liquid diene polymer at ambient temperature for from 0.5 to 50 hours, in the presence of ultraviolet light and with a mol ratio of polythiol to polymer of from about 1 to about 18. The product of this invention is not only clear and colorless but also is a hard, durable solid which has excellent heat, weather and chemical resistance as well as being substantially insoluble in organic and inorganic solvents. The clear, colorless, solid product of this invention due to its rigidity and inertness is superbly suited for can coatings, pints, organic glass applications and the like.

Accordingly, it is an object of this invention to provide a clear, colorless, solid polysulfide polymer. It is another object of this invention to provide a novel method for producing such a polysulfide polymer.

Other aspects, objects and the several advantages of the invention will be apparent to those skilled in the art from the description and the appended claims.

According to this invention an alkyl polythiol having the formula $Y(SH)_n$ where Y is an alkyl radical having from 2 to 6 carbon atoms per molecule and $n$ is 2 or 3, preferred alkyl polythiols being one selected from the group consisting of ethane dithiol, propane dithiol, butane dithiol, propane trithiol and butane trithiol, is reacted with a polyunsaturated liquid polymer of a diene having from 4 to 6 carbon atoms per molecule, preferably a liquid diene polymer non-conjugated as to double bond placement, at ambient temperatures, i.e. from about 60° to about 90° F., preferably from about 70° to about 80° F., for from about 5 minutes to about 50 hours, preferably from about 0.5 to about 30 hours, and in the presence of ultraviolet light. The mol ratio of polythiol to polymer is from about 1 to about 18, preferably from about 5 to about 15.

Although it is not completely understood and therefore it is not desired to be bound thereby, it appears that what occurs during the reaction is illustrated by the following equation. No attempt to show structural arrangement of the polymer is to be inferred:

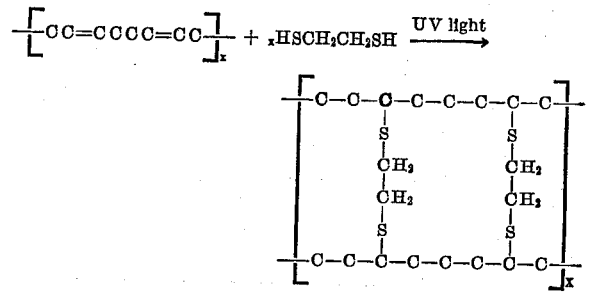

The resultant polymer from the above reaction appears to be a macromolecule, highly cross-linked through the sulfide between polymer chains as indicated.

The polyunsaturated liquid polymers useful in this invention can be made by mass or emulsion polymerization, recipes therefor being well known. A method which is preferred is mass polymerization in the presence of finely divided sodium as described in U.S. Patent 2,631,175 issued to Crouch on Mar. 10, 1953. Typical properties of the polybutadiene polymer prepared according to the invention of Crouch are:

| | |
|---|---|
| Gardner color | 10 |
| Viscosity, SFS at 100° F. | 1500 |
| Specific gravity, 20° | 0.91 |
| Double bonds per $C_4$ unit | 0.8 |
| Refractive index, $n_D^{20}$ | 1.519 |
| Iodine number | 385 |

It is to be understood that other diene polymers are amenable to this invention, for example a polybutadiene polymer having a molecular weight of from about 500 to about 5000, preferably about 1000 to about 3000, can be used. The preferred liquid polymer reactant is a nonconjugated polymer prepared from dienes such as butadiene, isoprene, piperylene, 2,3-dimethyl-1,3-butadiene, 2-methyl-1,3-pentadiene, and the like. For other dienes see copending application, Serial No. 45,042, filed July 25, 1960.

Although the mole ratio of polythiol to polymer can be in the range of from about 1 to about 18, a mol ratio in the range of from about 5 to about 15 is preferred since the rigidity of the product and the rate of solidification tend to increase directly with the mol ratio at least up to a mol ratio of 10.

The reaction of the polythiol and polymer at ambient temperatures for the time periods above specified should be, for the duration of such time periods, continuously in the presence of ultraviolet light furnished either by direct sunlight or by artificial means such as a 450-watt Hanovia mercury vapor UV lamp (type 54A36) or a 100-watt mercury vapor bulb.

It is within the scope of this invention to utilize reaction promoters which will give faster reaction rates and broaden the range of light wavelengths utilizable in the invention. Generally, any reaction promoter can be utilized but preferred promoters include those selected from the group consisting of trimethylphosphite triethylphosphite, triphenylphosphite, rose bengal and acetone.

Example 1

A polybutadiene polymer having the properties:

| | |
|---|---|
| Refractive index, 20/D | 1.5163 |
| Specific gravity, 60/60 | 0.9188 |
| Mol weight | 2110 |
| Viscosity at 77° F., poise | 274 |
| Polymer distribution by infrared: | |
|    Trans | 43.5 |
|    Vinyl | 16.8 |
|    Cis | 39.7 | in the amount of 211 grams (0.1 mol) was weighed into a one-pint clear, soft-glass bottle. There was then added 141 grams (1.5 mols) of 1,2-ethane dithiol. The contents of the bottle were mixed and then placed in direct sunlight for 1 hour at ambient temperatures of from about 70° to about 80° F. At the end of 1 hour the mixture was inspected and found to have set into a hard gel-like solid. At the end of approximately 30 hours of exposure to direct sunlight at ambient temperatures, the mixture was removed from the bottle and was found to be a hard, rigid, clear block of material.

*Example II*

A polybutadiene polymer having the properties:

| | |
|---|---|
| Color, Gardner | 10 |
| Molecular weight | 1500 |
| Viscosity, centipoises, 100° F. | 2500–5000 |
| Specific gravity, $D_4^{20}$ | 0.91 |
| Double bonds per $C_4$ unit | 0.8 |
| Refractive index, $n_D^{20}$ | 1.519 |
| Iodine number | 325 | was mixed with 1,2-ethane dithiol in the amount of 10 mols of 1,2-ethane dithiol to 1 mol of polymer. The mixture was exposed to direct sunlight for 15 hours at ambient temperatures of from about 70° to about 80° F. At the end of 15 hours the mixture was found to be a hard, rigid, clear block of material.

Reasonable variations and modifications of this invention can be made, or followed, in view of the foregoing disclosure without departing from the spirit or scope thereof.

I claim:

1. A method for making a clear, solid polymer comprising reacting an alkyl polythiol having the formula $Y(SH)_n$ where Y is an alkyl radical having from 2 to 6 carbon atoms per molecule and $n$ is 2 or 3 and a liquid polymer formed from a hydrocarbon diene having from 4 to 6 carbon atoms per molecule at from about 60 to about 90° F., in the presence of ultraviolet light and with a mol ratio of polythiol to polymer of from about 1 to about 18.

2. A method for making a clear, solid polymer comprising reacting a polythiol selected from the group consisting of ethane dithiol, propane dithiol, butane dithiol, propane trithiol and butane trithiol and a liquid polymer having a molecular weight of from about 500 to about 5000, said liquid polymer being formed from a hydrocarbon diene having from 4 to 6 carbon atoms per molecule at from about 60 to 90° F. for from 0.5 to 50 hours, in the presence of ultraviolet light as substantially the only reaction promoter and with a mole ratio of polythiol to polymer of from about 1 to about 18.

3. The method of claim 2 wherein said polymer has a molecular weight of from about 1000 to about 3000 and said hydrocarbon diene from which said polymer is formed is non-conjugated as to double bond placement.

4. The method of claim 2 wherein the temperature is from about 60° to about 90° F., the time is from about 0.5 to about 30 hours, the mol ratio of polythiol to polymer is from about 5 to about 15.

5. The method of claim 2 wherein there is added to the polythiol and polymer a reaction promoter selected from the group consisting of trimethylphosphite, triethylphosphite, triphenylphosphite, rose bengal and acetone.

6. A method for making a clear, solid polymer comprising reacting 1,2-ethane dithiol and liquid polybutadiene at a temperature of from about 60° to about 90° F., for from about 0.5 to about 30 hours, in the presence of direct sunlight as substantially the only reaction promoter and with a mol ratio of 1,2-ethane dithiol to polybutadiene of from about 5 to about 15.

7. The method of claim 6 wherein the polybutadiene has a molecular weight of from about 1000 to about 3000.

8. The product of claim 1.

9. The product of claim 6.

References Cited

UNITED STATES PATENTS

| | | | |
|---|---|---|---|
| 2,563,383 | 8/1951 | Vaughn et al. | 204—158 |
| 2,721,185 | 10/1955 | Schulze et al. | 260—79.5 |
| 2,964,502 | 12/1960 | Wheelock | 260—79 |
| 3,030,344 | 4/1962 | Argabright et al. | 260—79 |
| 3,081,352 | 3/1963 | Gardner et al. | 260—79 |
| 3,223,738 | 12/1965 | Crain et al. | 260—609 |

DONALD E. CZAJA, *Primary Examiner.*

LEON J. BERCOVITZ, *Examiner.*

M. I. MARQUIS, *Assistant Examiner.*